No. 695,024. Patented Mar. 11, 1902.
H. ARIENS & J. THOMPSON.
PULVERIZER.
(Application filed July 5, 1901.)
(No Model.) 2 Sheets—Sheet 1.
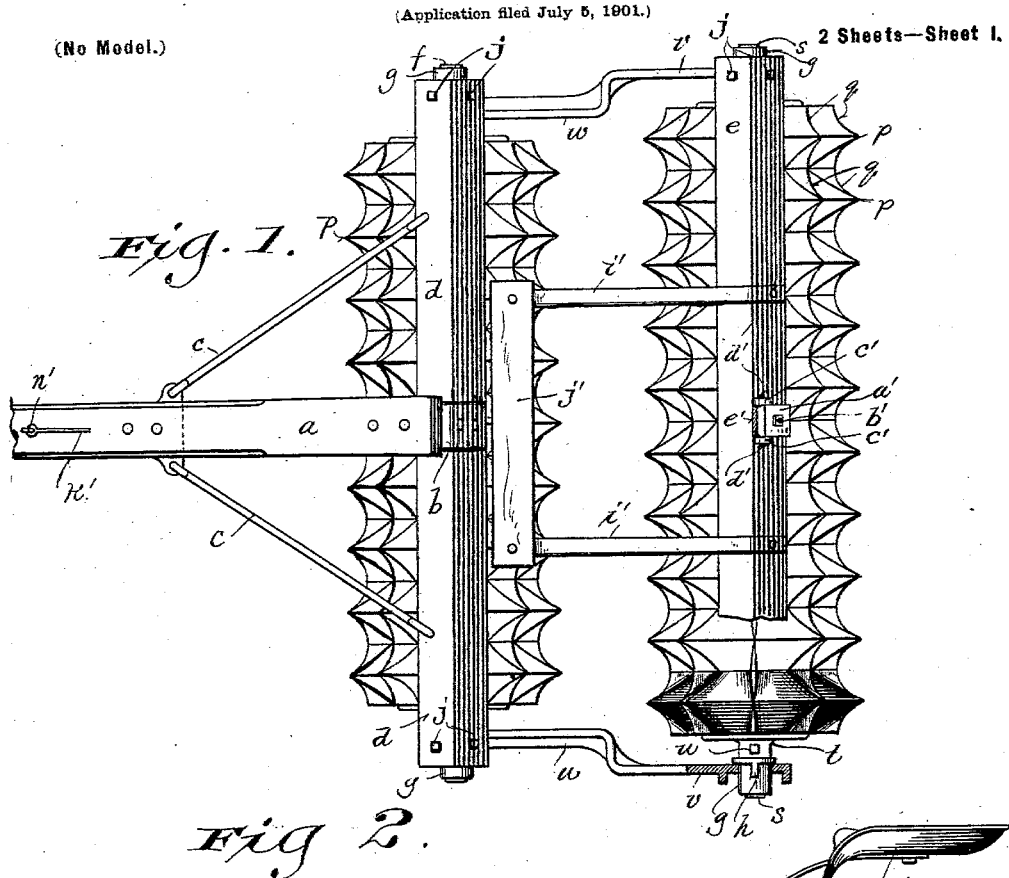
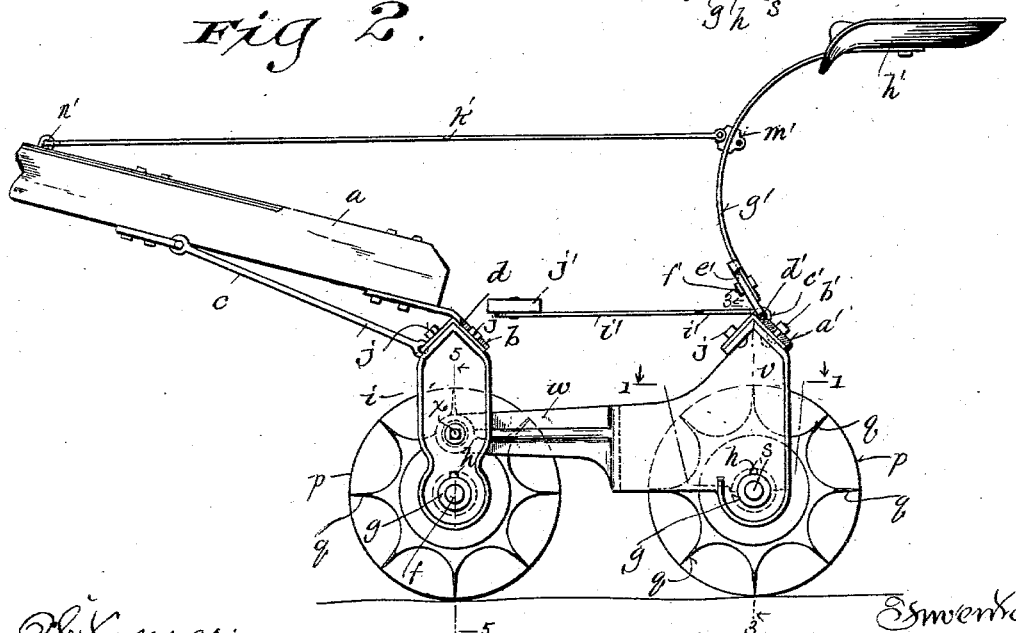
Witnesses:
Geo. W. Young.
B. C. Roloff.
Inventors
Henry Ariens
John Thompson
By H. G. Underwood
Attorney No. 695,024. Patented Mar. 11, 1902.
H. ARIENS & J. THOMPSON.
PULVERIZER.
(Application filed July 5, 1901.)
(No Model.) 2 Sheets—Sheet 2.
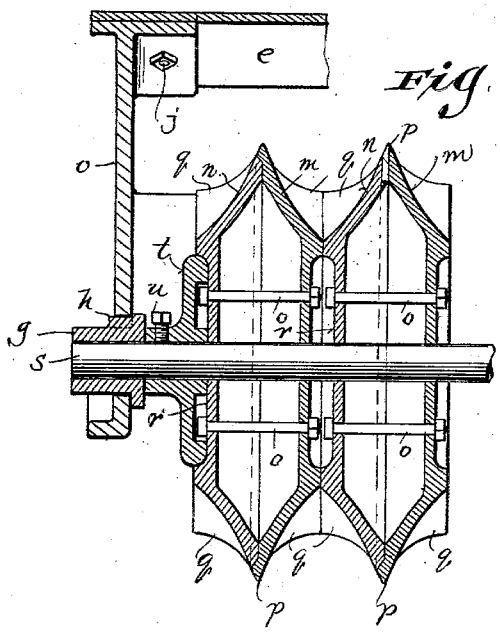
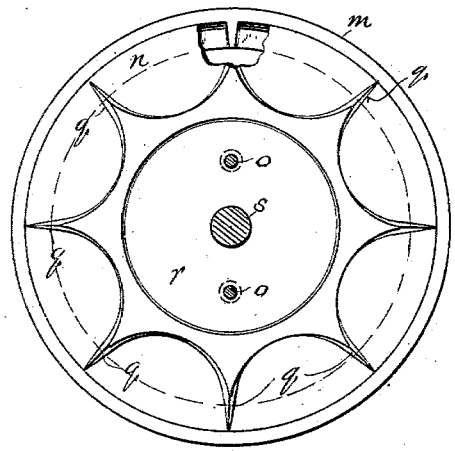
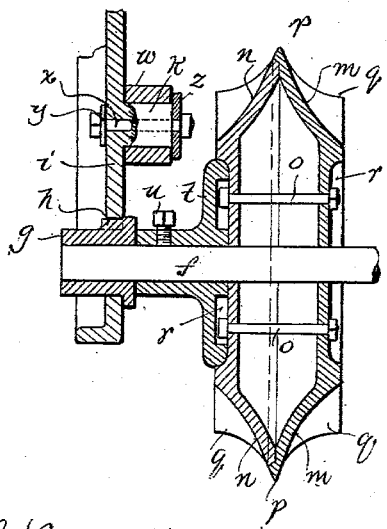
Witnesses:
Geo. W. Young.
B. C. Roloff.
Inventors
Henry Ariens.
John Thompson.
By H. G. Underwood
C. W. Vorwerg

UNITED STATES PATENT OFFICE.

HENRY ARIENS AND JOHN THOMPSON, OF BRILLION, WISCONSIN.

PULVERIZER.

SPECIFICATION forming part of Letters Patent No. 695,024, dated March 11, 1902.

Application filed July 5, 1901. Serial No. 67,142. (No model.)

*To all whom it may concern:*

Be it known that we, HENRY ARIENS and JOHN THOMPSON, citizens of the United States, and residents of Brillion, in the county of Calumet and State of Wisconsin, have invented certain new and useful Improvements in Pulverizers; and we do hereby declare that the following is a full, clear, and exact description thereof.

Our invention relates to devices for pulverizing the earth in preparing the same for planting; and it consists in certain peculiarities of construction and combination of parts, as will be fully set forth hereinafter in connection with the accompanying drawings and subsequently claimed.

In the said drawings, Figure 1 is a plan view of our improved pulverizer, partly in section, on the line 1 1 of Fig. 2 and with the seat-support socket in section and the seat consequently not shown and with the front end of the tongue and one end of the rear cross-bar broken away. Fig. 2 is a side elevation of the said pulverizer, also partly in section. Fig. 3 is a vertical sectional view taken on the plane indicated by the line 3 3 in Fig. 2. Fig. 4 is a side elevation of one of our improved disks, partly broken away and with the axle and securing-bolts in section. Fig. 5 is a vertical sectional view taken on the plane indicated by the line 5 5 in Fig. 2.

Our pulverizer consists, primarily, of a front and rear row of disks of peculiar construction, as hereinafter described, each row being supported by a transverse axle in suitable end frames and the front and rear frames pivotally connected together, the disks being arranged so that the greatest diameters or deepest-cutting edges of those in one row alternate in line with the like part of the disks in the other row, so that each row has independent action and at different planes, if necessary.

Referring to the drawings, $a$ represents the tongue or pole of our pulverizer, secured by strap $b$ and brace-rods $c$ $c$ to the front cross-bar $d$ of our device, which in its preferred form, herein illustrated, consists of an iron angle-plate. The rear cross-bar $e$ is of similar construction. The front axle $f$ is supported in suitable boxes $g$, which are themselves supported by the uprights $i$ of the front frames and kept from rotating with the axle by means of feathers $h$, fitting within recesses in the said uprights, the front cross-bar $d$ extending across from one front upright to the other and being secured at its ends thereto by bolts $j$ $j$, as shown. The uprights $i$ are further provided with inward-extending studs $k$ for connection to the rear end frames of the pulverizer, as hereinafter described.

The pulverizer-disks are each composed of two hollow sections $m$ $n$, secured together by bolts $o$ $o$ and nuts, and the said disks as thus completed have not only the sharp annular central cutting edge $p$, but also lateral or transverse cutting edges $q$ $q$, which, taken in connection with the hereinbefore-described alternate arrangement of the cutting edges $p$ in the disks of the front and rear rows, results in a very complete and even pulverization of the soil. The said disks are all made straight and vertical on their outer sides, so as to be closely assembled together on the axles, their said outer faces having a central circular depression $r$ therein, which affords room for the heads and nuts of the said bolts $o$, so that the successive disks can come closely together, as best shown in Fig. 3, where the rear axle is shown, (marked $s$,) the said circular depressions $r$ also receiving at each end of each row of disks the sleeved bearings $t$, whose hubs abut against the inner ends of the described boxes $g$, and which bearings are secured to the axles $f$ and $s$ by set-screws $u$, the boxes and bearings having the same reference-letters for both the front and rear axles and the boxes $g$ at the rear being supported by and within the uprights $v$ of the rear frames in precisely the same manner as the front boxes are supported by and within the front frame-uprights $i$. The rear uprights $v$ have forward continuations $w$, whose forward ends are formed with bores therethrough to engage with the hereinbefore-named inward projecting studs $k$ of the front uprights $i$, to which they are secured by the pivot-bolt $x$ and suitable washers $y$ $z$ and nuts, as best shown in Fig. 5.

The rear cross-bar $e$ is secured to the rear uprights $v$ by bolts $j$ and nuts, just as the front cross-bar is secured to the front uprights. The said rear cross-bar $e$ at its center is provided with a block $a'$, bolted thereto, as shown at $b'$, and having curved fingers $c'\ c'$, which receive and inclose trunnions $d'\ d'$, projecting laterally from the lower end of a flanged socket-plate $e'$, to which is bolted, as shown at $f'$, the lower end of a backwardly-curved seat-support $g'$, which carries at its free upper end a seat $h'$, and on each side of the said seat-support $g'$ other spring-supports $i'\ i'$ are bolted at their rear ends to the said rear cross-bar $e$ and project forward to receive a transverse foot-rest $j'$. A brace-rod $k'$ extends between a clip $m'$ on the seat-support $g'$ and a staple $n'$ on the tongue or pole $a$, whereby the seat $h'$ is kept in proper position irrespective of the elevation or depression of the rear frame and row of disks at any time, the flanged socket-plate $e'$ rocking on its trunnions $d'\ d'$ with each change of elevation of the said rear frame or of the tongue or pole, and thereby adding to the comfort of the driver.

By reason of their described transverse edges $q\ q$ our disks are rendered very efficient for covering seed after same has been planted.

We do not claim in this application the construction of the pulverizer-frame hereinbefore described, reserving the same and all novel matters shown but not claimed in this application as the subject of a divisional application for patent filed February 8, 1902, under Serial No. 93,205.

Having thus described our invention, what we claim as new, and desire to secure by Letters Patent, is—

1. A pulverizer, comprising front and rear end frames, jointed together, so as to have independent vertical movement; transverse axles journaled in said end frames; and series of disks mounted on said axles, each disk having a central annular cutting edge, and transverse cutting edges on each side thereof, and the said disks being arranged so that the central annular cutting edges of the disks in one row shall be in line with the meeting edges of the transverse cutting edges of each two adjacent disks in the other row.

2. In a pulverizer, a series of disks, each disk comprising a pair of hollow sections, bolted together, and having a central annular cutting edge, and series of transverse cutting edges on each side thereof.

In testimony that we claim the foregoing we have hereunto set our hands, at Brillion, in the county of Calumet and State of Wisconsin, in the presence of two witnesses.

HENRY ARIENS.
JOHN THOMPSON.

Witnesses:
W. A. BAKER,
HERMAN ARIENS.